United States Patent
Inoue et al.

(10) Patent No.: US 8,738,829 B2
(45) Date of Patent: May 27, 2014

(54) INFORMATION SYSTEM FOR REPLACING FAILED I/O BOARD WITH STANDBY I/O BOARD

(75) Inventors: Makiko Inoue, Kawasaki (JP); Satoshi Sue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 26 days.

(21) Appl. No.: 13/490,934

(22) Filed: Jun. 7, 2012

(65) Prior Publication Data

US 2012/0311223 A1 Dec. 6, 2012

Related U.S. Application Data

(63) Continuation of application No. PCT/JP2009/070468, filed on Dec. 7, 2009.

(51) Int. Cl.
*G06F 13/00* (2006.01)

(52) U.S. Cl.
USPC ............ 710/104; 710/302; 710/312; 714/4.1; 714/4.12; 714/4.5

(58) Field of Classification Search
USPC .............. 710/104, 312, 313, 301, 302; 714/3, 714/4.11, 4.12, 4.5, 43
See application file for complete search history.

(56) References Cited

U.S. PATENT DOCUMENTS

| | | | | |
|---|---|---|---|---|
| 5,508,910 A | * | 4/1996 | Diehl | 700/82 |
| 5,530,891 A | | 6/1996 | Gephardt | |
| 6,571,360 B1 | * | 5/2003 | Drogichen et al. | 714/44 |
| 6,658,599 B1 | | 12/2003 | Linam et al. | |
| 6,708,283 B1 | * | 3/2004 | Nelvin et al. | 714/5.11 |
| 2002/0006113 A1 | * | 1/2002 | Choi | 370/241 |
| 2002/0112075 A1 | | 8/2002 | Takashimizu et al. | |
| 2002/0169901 A1 | | 11/2002 | Fujibayashi et al. | |
| 2003/0035408 A1 | * | 2/2003 | Hebert | 370/349 |
| 2004/0158656 A1 | | 8/2004 | Fujibayashi et al. | |
| 2005/0210191 A1 | | 9/2005 | Kobayashi et al. | |
| 2006/0277403 A1 | | 12/2006 | Fujibayashi et al. | |
| 2007/0101059 A1 | | 5/2007 | Kobayashi et al. | |
| 2007/0245136 A1 | | 10/2007 | Fujibayashi et al. | |

FOREIGN PATENT DOCUMENTS

| | | |
|---|---|---|
| EP | 0685798 | 5/1995 |
| JP | 4-281548 | 10/1992 |
| JP | 8-16505 | 1/1996 |
| JP | 8-016505 | 1/1996 |
| JP | 8-055038 | 2/1996 |
| JP | 8-55038 | 2/1996 |

(Continued)

OTHER PUBLICATIONS

International Search Report, mailed Mar. 2, 2010, in corresponding International Application No. PCT/JP2009/070468.

(Continued)

*Primary Examiner* — Glenn A Auve
(74) *Attorney, Agent, or Firm* — Staas & Halsey LLP

(57) ABSTRACT

An information system includes a configuration controller board having a capability to set, to each I/O bus bridge device in the alternative I/O board, the logical bus number set in corresponding I/O bus bridge device in the failed I/O board 20, and to set to the I/O bus bridge device in the system board 10 connected with the alternative I/O board, the same downstream side logical bus number as that of the I/O bus bridge device in the system board connected with the failed I/O board.

6 Claims, 11 Drawing Sheets

(56) References Cited

FOREIGN PATENT DOCUMENTS

| JP | 10-011319 | 1/1998 |
|----|-----------|--------|
| JP | 10-11319 | 1/1998 |
| JP | 2000-29636 | 1/2000 |
| JP | 2002-82844 | 3/2002 |
| JP | 2002-082844 | 3/2002 |
| JP | 2002-222160 | 8/2002 |
| JP | 2002-333956 | 11/2002 |
| JP | 2003-316752 | 11/2003 |
| JP | 2005-267111 | 9/2005 |
| JP | 2008-227604 | 9/2008 |
| JP | 2009-140081 | 6/2009 |

OTHER PUBLICATIONS

English Translation of International Preliminary Report on Patentability mailed Jul. 19, 2012 in corresponding International Patent Application No. PCT/JP2009/070468.

Japanese Office Action mailed Jul. 16, 2013 in corresponding Japanese Application No. 2011-545000.

Japanese Office Action issued Oct. 15, 2013 for Japanese Application No. 2011-545000.

* cited by examiner

US 8,738,829 B2

INFORMATION SYSTEM FOR REPLACING FAILED I/O BOARD WITH STANDBY I/O BOARD

CROSS-REFERENCE TO RELATED APPLICATION

This application is a continuation application of International Application PCT/JP2009/070468 filed on Dec. 7, 2009 and designated the U.S., the entire contents of which are incorporated herein by reference.

FIELD

The technology disclosed in this specification is related to an information system including a system board and multiple I/O boards.

BACKGROUND

Among existing information systems (server system etc.), there exists, as illustrated in FIG. 13, an information system including one or more (in the figure, two) system boards, multiple I/O boards, and a configuration controller board.

The system board in this information system is a board equipped with a CPU (not illustrated), an I/O bus bridge 51 (a circuitry including multiple I/O bus bridge devices 52) for communicating with other boards, etc. The I/O board is a board equipped with an I/O device (not illustrated), the I/O bus bridges 51, and the like. The configuration controller board is a board having a capability to set, with respect to each I/O base bride 52 in each board, logical bus numbers of two buses connected with the I/O base bride 52 when the information system is activated, a capability to monitor the status (abnormality) of each boards, and so on.

This information system is a system that functions without troubles, if only the logical bus numbers are appropriately set to each I/O bus bridge 51 on each board. The configuration controller board in the existing information system has, nevertheless, only the capability to set logical bus numbers to all of the I/O bus bridge devices 52 in the system.

Therefore, when an I/O board of the existing information system fails, a reset of the information system is required to use a backup I/O board in place of the failed I/O board even if the backup I/O board already exists in the system. A reset is also required to add an I/O board to the existing information system.

PRIOR ART DOCUMENTS

Patent Documents

Patent document 1: Japanese Laid-open Patent Publication No. 10-011319
Patent document 2: Japanese Laid-open Patent Publication No. 2003-316752
Patent document 3: Japanese Laid-open Patent Publication No. 08-055038
Patent document 4: Japanese Laid-open Patent Publication No. 2002-082844

SUMMARY

According to an aspect of the embodiments, an information system includes a system board having a first bridge device and a second bridge device, each being an I/O bus bridge device into which set are a logical bus number of a upstream-side bus that resides on its upstream side and a logical bus number of a downstream-side bus that resides on its upstream side; an active I/O board having multiple I/O bus bridge devices, into each of which set are a logical bus number of a upstream-side bus and a logical bus number of a downstream-side bus, and which includes an I/O bus bridge device connected via a bus to the first bridge device of the system board; a standby I/O board, for being used in place of the active I/O board when the active I/O board fails, having multiple I/O bus bridge devices, into each of which set are a logical bus number of a upstream-side bus and a logical bus number of a downstream-side bus, and which includes an I/O bus bridge device connected via a bus to the first bridge device of the system board; and a configuration controller board being connected to the system board, the active I/O board and the standby board via respective control buses, and having a capability to perform an I/O board replacement process that sets the logical bus number of the downstream side bus set in the first bridge device into the second bridge device after stopping operation of the first bridge device, and then sets each logical bus number set in each the multiple I/O bus bridge devices of the first bridge device into corresponding I/O bus bridge device of the standby I/O bus bridge devices.

According to another aspect of the embodiments, an information system includes a system board having multiple I/O bridge devices into each of which set are a logical bus number of a upstream-side bus that resides on its upstream side and a logical bus number of a downstream-side bus that resides on its upstream side; a backplane having a system board connector into which the system board is inserted, and multiple I/O board connectors each for inserting an I/O board having multiple I/O bridge devices into each of which set are a logical bus number of a upstream-side bus that resides on its upstream side and a logical bus number of a downstream-side bus that resides on its upstream side; a configuration controller board connected to the system board inserted in the system board connector of the backplane and the I/O board inserted in each of the multiple I/O system board connectors of the backplane via respective buses, and having a capability to perform an I/O board replacement process that sets the logical bus number of the downstream side bus set in the first bridge device into the second bridge device after stopping operation of the first bridge device, and then sets each logical bus number set in each the multiple I/O bus bridge devices of the first bridge device into corresponding I/O bus bridge device of the standby I/O bus bridge devices; and a backplane having a system board connector into which the system board is inserted, and multiple I/O board connectors each for inserting an I/O board having multiple I/O bridge devices into each of which set are a logical bus number of a upstream-side bus that resides on its upstream side and a logical bus number of a downstream-side bus that resides on its upstream side.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT(S)

An embodiment of an information system (denoted hereinafter as the information system according to the embodiment) that is developed by the inventors will hereinafter be described with reference to the accompanying drawings.

First, outline of the information system according to the embodiment will be explained referring to FIGS. 1 through 6.

Figure 1:
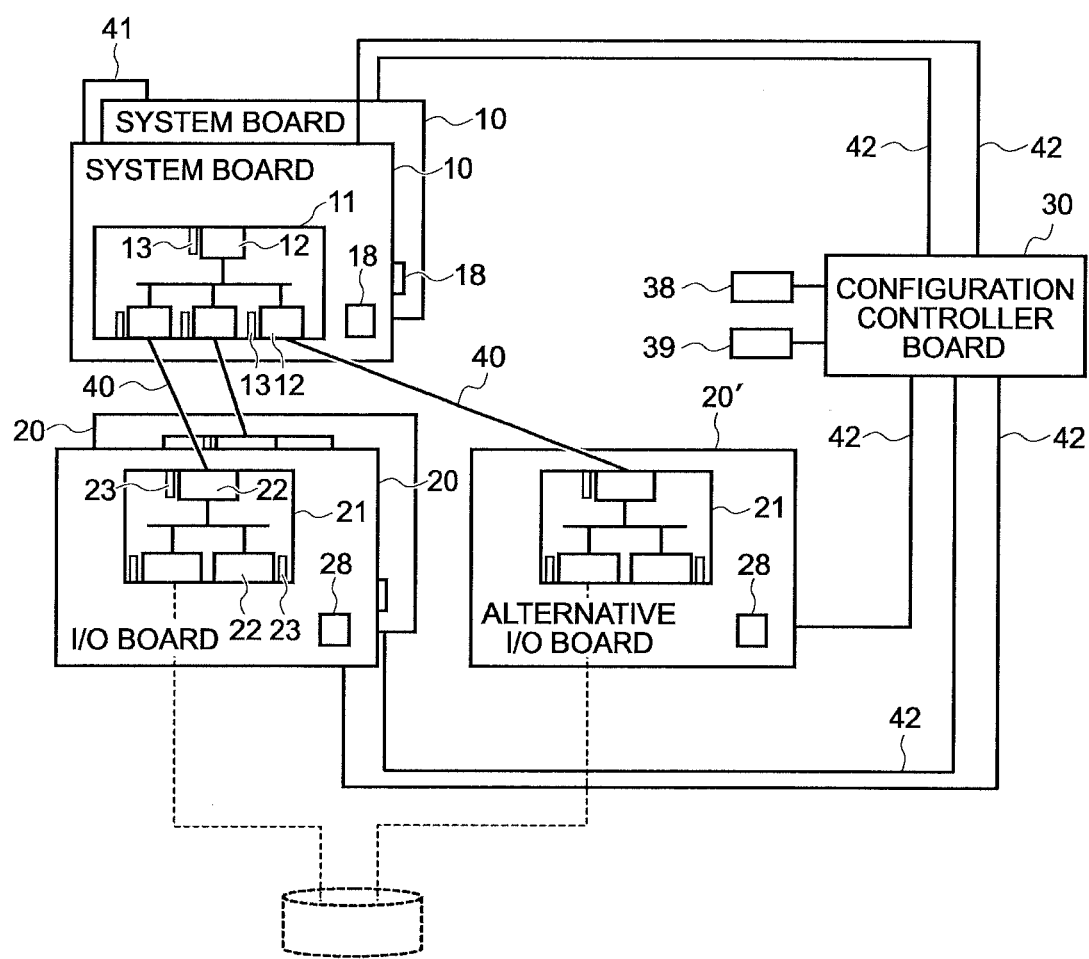
FIG. 1 is schematic block diagram of an information system according to an embodiment.

As schematically illustrated in FIG. 1, the information system according to the embodiment includes multiple system boards 10, multiple I/O boards 20, some alternative I/O boards 20' (one alternative I/O board 20' in the figure), a configuration controller board 30, a display unit 38, and an input unit 39. Moreover, the information system also includes a backplane not illustrated. Note that the backplane is a unit that has multiple slots (connectors) and makes bus connections between boards inserted in the slots.

Figure 2:
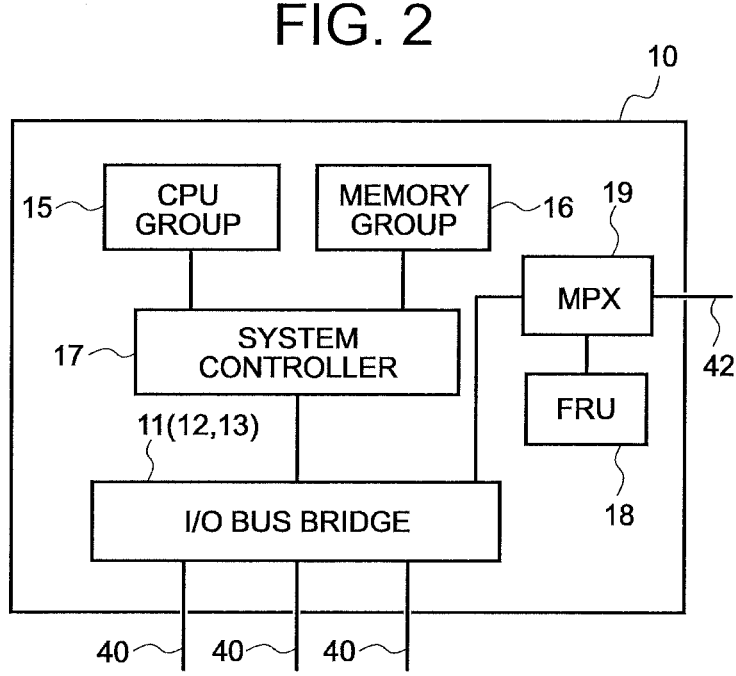
FIG. 2 is a block diagram of a system board in the information system according to the embodiment.

Each system board 10 in this information system is, as exemplified in FIG. 2, a board including an I/O bus bridge 11, an CPU group 15, a memory group 16, a system controller 17, an FRU (Field Replaceable Unit) information memory 18, an I2C ($I^2C$: Inter-Integrated Circuit) multiplexer (denoted hereinafter as MPX), etc.

The system controller 17 is a device that controls information distribution among the CPU group 15, the memory group 16, and the I/O bus bridge 11. Note that, the CPU group 15 is defined as one or more CPUs (Central Processing Units), and the memory group 16 is defined as some ROMs stored with a BIOS etc., multiple RAMs used as a working area, or the like.

Figure 3:
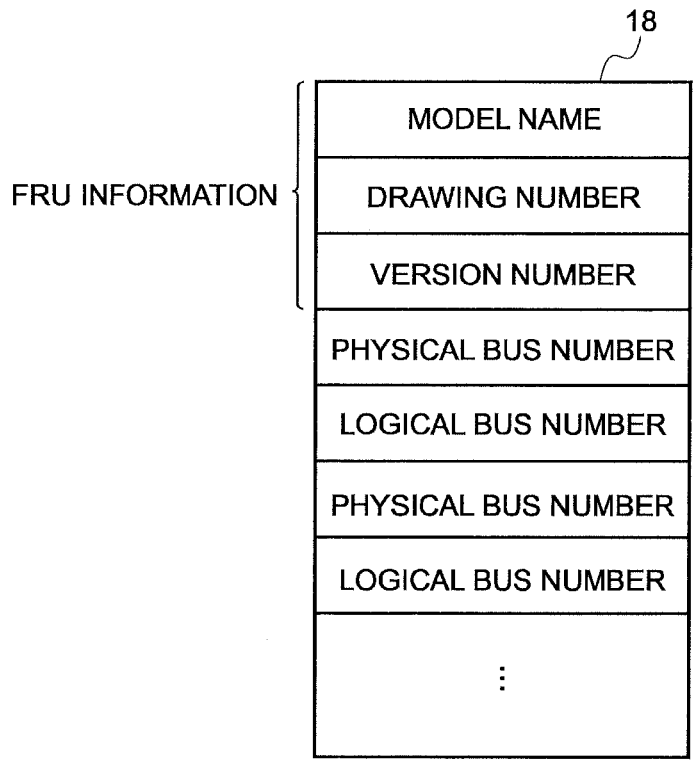
FIG. 3 is an explanatory diagram of a FRU information memory.

The FRU information memory 18 is a rewritable nonvolatile memory (EEPROM etc.). As schematically illustrated in FIG. 3, the FRU information memory 18 is used for storing FRU information, and physical bus number and logical bus number of each bus connected with each I/O bus bridge device 12.

Here, the FRU information is information that indicates specification (configuration and facilities) of a self-board. This FRU information is preset information in the FRU information memory 18.

A physical bus number is a bus number that is pre-assigned to each bus based on the physical location of each bus within the information system. Moreover, a logical bus number is a bus number that the configuration controller board determines based on the actual configuration of the information system, i.e., the number, the types, etc of the boards installed in the information system.

The physical bus number and logical bus number of each bus in the FRU information memory 18 are values that the configuration controller board 30 set when the information system is started. They are also values that the configuration controller board 30 rewrites when changing the relationship between the physical bus number and the logical bus number relating to the corresponding bus in an I/O board 20 (details will be discussed later).

An MPX (I2C multiplexer) 19 (FIG. 2) is an interface device for I2C Bus. The MPX 19 is connected with the FRU information memory 18 and the I/O bus bridge 11 by an internal bus. Moreover, the MPX 19 is connected with the configuration controller board 30 via a control bus 42 that is an I2C Bus.

As illustrated in FIG. 1, the I/O bus bridge 11 is a circuit that includes multiple I/O bus bridge devices 12 each for connecting two buses, and hot plug controllers 13 for the respective I/O bus bridge devices 12.

Each I/O bus bridge device 12 in the I/O bus bridge 11 is a device that needs the logical bus number of the upstream side bus and the logical bus number of the downstream side bus being set in order to operate (function). Note that, the upstream side bus is defined as the bus, among two buses connected with each I/O bus bridge device 12 or 22, that resides on the side of the I/O bus bridge device 12 or 22 nearer to the CPU group 15, and the downstream side bus is defined as the other bus (the bus that does not resides on the CPU group 15 side). Namely, for example, the downstream side bus of any one of the I/O bus bridge devices 12 depicted on the lower side of the system board 10 in FIG. 1 is the I/O bus 40 via which the system board 10 and the I/O boards 20 are connected. Moreover, the upstream side bus of the same I/O bus bridge device 12 is the bus via which the I/O bus bridge devices 12 in the I/O bus bridge 11 are connected.

Each hot plug controller 13 in the I/O bus bridge 11 is basically a device that performs a process of incorporating the I/O bus bridge device 12 into the information system in accordance with an instruction given from the configuration controller board 30 through the control bus 42, a process of separating the I/O bus bridge device 12 from the information system, and the like. However, each hot plug controller 13 is also a device that can perform a process of setting the logical bus number designated by the configuration controller board 30 into the I/O bus bridge 11.

Incidentally, although not illustrated in the I/O bus bridge 11 of FIG. 1, the actual I/O bus bridge 11 also includes the I/O bus bridge device 12 for a dedicated bus 41 via which the system boards 10 is connected.

Figure 4:
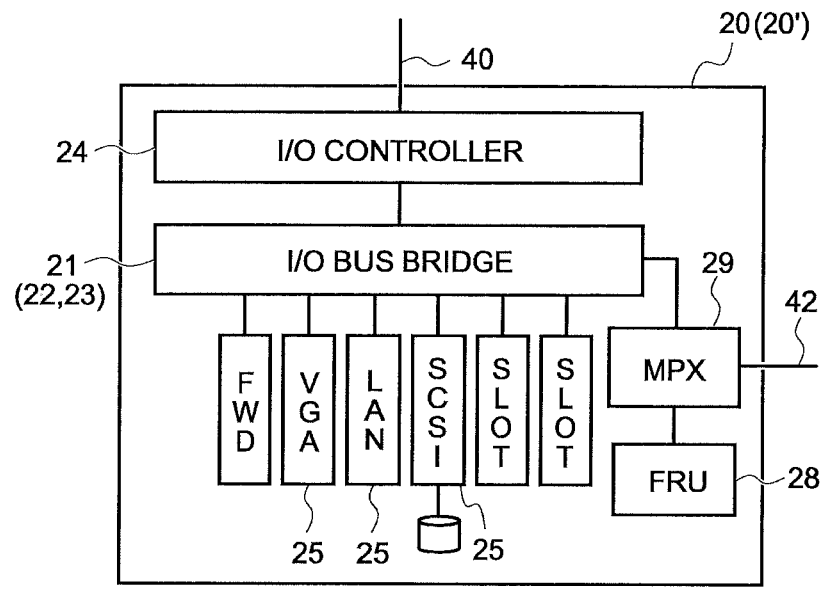
FIG. 4 is a block diagram of the I/O board in the information system according to the embodiment.

Each I/O board 20 in the information system is, as exemplified in FIG. 4, a board including the I/O bus bridge 21; an I/O controller 24; multiple I/O devices 25 (a LAN card etc.); an FRU information memory 28; an MPX (an I2C multiplexer) 29; an FWD that holds firmware; and the like.

The I/O controller 24 is a device that controls information distribution between I/O bus 40 and the I/O bus bridge 21.

Each I/O device 25 (FIG. 4) in the I/O board 20 is a device that performs I/O processing. The FRU information memory 28 is a memory whose purpose and capability are the same with those of the FRU information memory 18 (FIG. 3). That is, the FRU information memory 28 is a rewritable nonvolatile memory for storing the FRU information indicating the specification of the I/O board 20, and the physical bus number and logical bus number of each bus connected with each I/O bus bridge device 22 in the I/O board 20.

The MPX 29 is the same device as the MPX 19. The MPX 29 in the I/O board 20 is connected with the FRU information memory 28 and the I/O bus bridge 21 via an internal bus, and is connected with the configuration controller board 30 via the control bus 42.

The I/O bus bridge 21 is, as depicted in FIG. 1, a circuit including multiple I/O bus bridge devices 22 and hot plug controllers 23 for the respective I/O bus bridge devices 22. Each I/O bus bridge device 22 in this I/O bus bridge 21 is a device having the same function as that of the I/O bus bridge device 12 already explained. Similarly, each hot plug controllers 23 is a device having the same function as that of the hot plug controller 13 already explained.

Note that, although a detailed explanation of the circuit configuration is herein omitted, each I/O board is a board capable of being turned on and off through the control bus 42. Each I/O board is also a board wherein the FRU information can be read from the FRU information memory 28 when being turned off.

Figure 5:
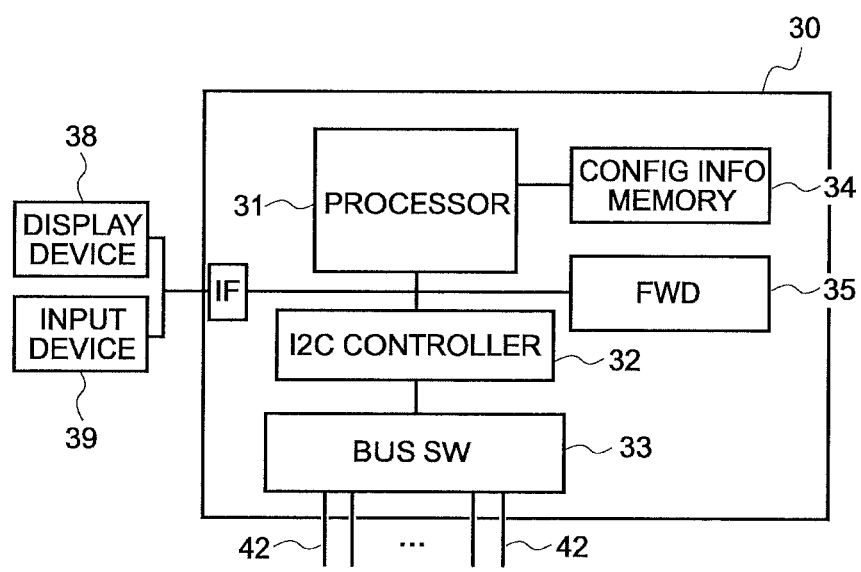
FIG. 5 is a block diagram of a configuration controller board in the information system according to the embodiment.

The configuration controller board 30 is, as illustrated in FIG. 5, a board including a processor 31, an I2C controller 32, a BUS switch ("BUS SW") 33, a configuration information memory 34 ("CONFIG INFO MEMORY"), an interface circuit ("IF"), etc.

The interface circuit in this configuration controller board 30 is an interface circuit for a display unit 38 and an input unit 39 (a keyboard etc.). The I2C controller 32 is an interface device for I2C Bus. The BUS switch 33 is a device that can connect the I2C controller 32 with an arbitrary MPX (one MPX among the MPX 29 in the I/O board 20 or 29, the MPX 19 in each system board 10, the MPX 29 in the alternative I/O board 20'). The FWD (Firmware Device) 35 is a device that is stored with firmware (a BIOS etc.)

Figure 6:
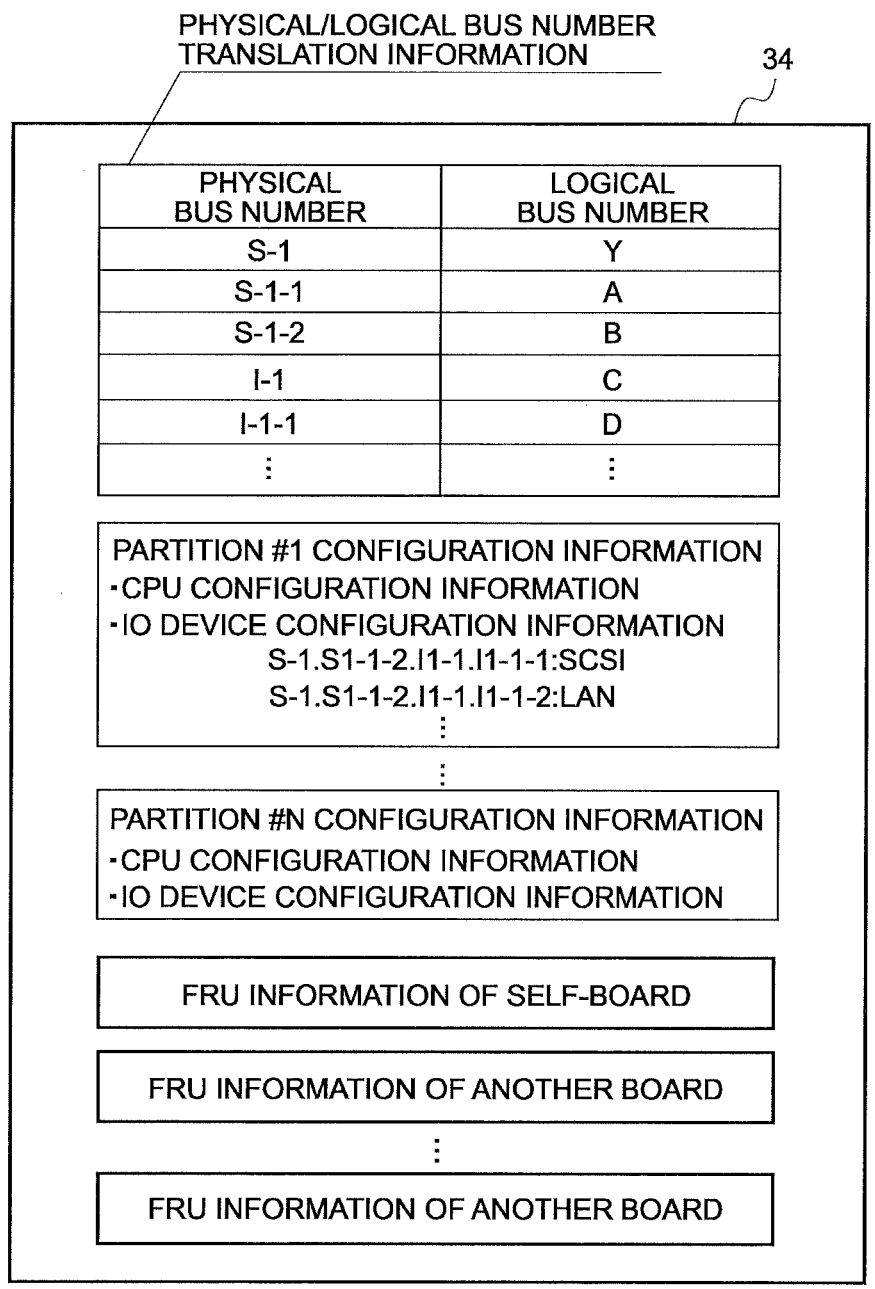
FIG. 6 is an explanatory diagram of a configuration information memory.

The configuration information memory 34 is a rewritable nonvolatile memory (an EEPROM, a flash ROM, etc.) for storing various pieces of information required for the configuration control of the information system. In this configuration information memory 34, as schematically illustrated in FIG. 6, stored are physical/logical bus number translation information, partition configuration information, the FRU information on the self-board, and the FRU information on each system board 10 and each I/O board 20 ("another board" in the figure).

The FRU information on the self-board in this configuration information memory 34 is information (a model name, a drawing number, and a version number: see FIG. 3) indicating the specification of the configuration controller board 30. The FRU information on another board in the configuration information memory 34 is a duplicate of the FRU information set in the FRU information memory 18 of each system board 10 or in the FRU information memory 28 of each I/O board 20.

The physical/logical bus number translation information is information that indicates a relationship between the physical bus number and the logical bus number of each bus in the information system. This physical/logical bus number translation information is information that is set and rewritten by the configuration controller board 30 in a manner similar to the physical bus number and logical bus number of each bus on the FRU information memory 18 or 28. That is, the configuration controller board 30 (processor 31) set the physical/logical bus number translation information when the information system is started, and rewrites the physical/logical bus number translation information when changing the relationship between the physical bus number and the logical bus number relating to the corresponding bus in an I/O board 20 (details will be discussed later).

The partition configuration information is information defining the configuration of a partition (a part of the information system that operates as a independent device). Though not described in detail, this partition configuration information contains information (see "S-1.S1-1-2.I1-1.I1-1-1:SCSI" etc. in the figure) that indicates a location (a connection relationship with other devices) within the information system of each I/O device 25 in a partition by the physical bus number of each bus that resides between the CPU group 15 and each I/O device 25. Further, the configuration controller board 30, by referring to each piece of the partition configuration information in the configuration information memory 34, determines the contents (logical bus number to each physical bus number) of the above-mentioned physical/logical bus number translation information.

The alternative I/O board 20' is a board that is used, when an I/O board 20 in the information system fails, in place of the I/O board 20 (which is, however, equivalent to the alternative I/O board 20'). If the alternative I/O board 20' is prepared as a substitute for the I/O board 20 that accesses to a disk unit, the alternative I/O board 20' is also connected with the disk unit as schematically illustrated in FIG. 1.

Based on the premise of what has been described so far, a configuration and an operation of the information system according to the present embodiment will be specifically explained. Note that, in the following discussion, the I/O bridge device 12 and the I/O bridge device 22 in the information system are respectively termed as the bridge device 22 and the bridge device 22. Moreover, the logical bus number of the upstream side bus and the logical bus number of the downstream side bus are respectively termed as the upstream side bus number and the downstream side bus number.

In each board of the information system according to the present embodiment, prepared is firmware that can achieve a state where each CPU group 15 can control every part without troubles if only the upstream side bus number and the downstream side bus number are appropriately set to each of the bridge devices 12 and 22. Further, the configuration controller board 30 is, similarly to the existing configuration controller board, a board that sets the logical bus number to each of the bridge devices 12 and 22 when the system is started.

However, a board replacement capability that makes one alternative I/O board 20' operate as a substitute of one I/O board 20 without shutting down the system is added to this configuration controller board 30. Moreover, to the configuration controller board 30, a board addition capability that adds a new I/O board 20 to the system without shutting down the system is also added.

First, the board replacement capability of the configuration controller board 30 will be described.

Figure 7:
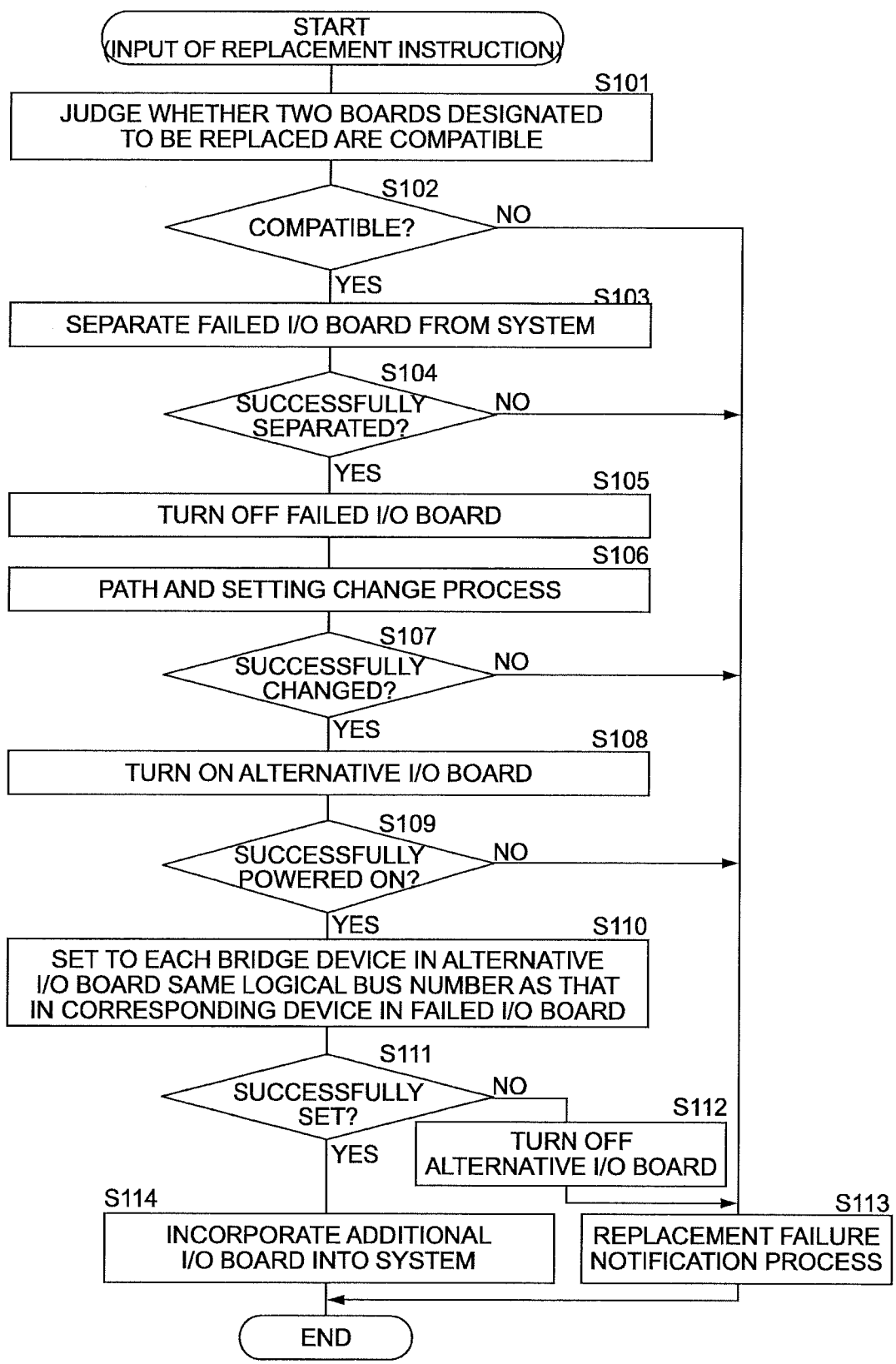
FIG. 7 is a flowchart of a board replacement process.

The configuration controller board 30 is configured (programmed) so as to perform the board replacement process in steps illustrated in FIG. 7 upon being instructed by an operator to replace a I/O board 20 failed with a certain alternative I/O board 20' through operation of the input device 39. Note that the configuration controller board 30 monitors an operation status of each board in the information system, and, when detecting that a certain board fails, displays on the screen of the display unit 38 a message indicating this purport. Therefore, the operator instructs the configuration controller board 30 to replace the I/O board 20 that failed (hereinafter simply termed as the failed I/O board 20) with a certain alternative I/O board 20' (hereinafter simply termed as the alternative I/O board 20') after the above-mentioned message is displayed on the screen of the display unit 38.

That is, when the instruction of replacing the failed I/O board 20 with the alternative I/O board 20' is entered, the configuration controller board 30 first performs a process (step S101) of judging whether or not the boards to be replaced are compatible with each other. More specifically, the configuration controller board 30 performs a process that reads out the FRU information from each of the alternative I/O board 20' and the failed I/O board 20, and judges that the two boards are compatible only when two pieces of the FRU information read match.

Note that, if there might be the boards whose FRU information match but whose actual configurations differ, it is desirable to adopt, as the process at step S101, a process that makes a more detailed comparison in configuration between the two boards after confirming that the two pieces of the information match, and then judges whether or not the two boards are compatible based on the comparison result.

When judging that the alternative I/O board 20' and the failed I/O board 20 are compatible (step S102; YES), the configuration controller board 30 performs a process (step S103) of separating the failed I/O board 20 from the system. More specifically, the configuration controller board 30 performs a process of making the hot plug controller 13, which is for the bridge device 12 connected with the failed I/O board 20, separate the bridge device 12 from the system.

When the bridge device 12 is successfully separated from the system (step S104; YES), the configuration controller board 30 turns off the failed I/O board 20 (step S105).

Afterwards, the configuration controller board 30 starts a path and setting change process (step S106), and performs a path change process first. The path change process is a process that changes (executes control for changing) the state of the bridge device 12 connected with the failed I/O board 20 and the state of the bridge device 12 connected with the alternative I/O board 20' to a standby state and an active state, respectively. Note that, the standby state of a device is defined as a state in which the device does not perform any action (processing) to the signals/data entered through each connected bus, and the active state of a device is defined as a state in which the device can perform actions to the signals/data entered through each connected bus.

When a change of states of the two bridge devices 12 (denoted hereinafter as a path change) is successful, the configuration controller board 30 performs a setting change process. This setting change process is a process of setting to the bridge device 12 connected with the alternative I/O board 20' the same downstream side bus number (the logical bus number of the downstream side bus) as that in the bridge device 12 connected with the failed I/O board 20. Note that, each of this setting change process and processes of setting the logical bus number which are explained later is a process performed by using the hot plug controller 13 or 23 for the bridge device 12 or 22 into which the logical bus number is to be set.

The configuration controller board 30 having finished the setting change process finishes the path and setting change process. Whereas if the path change fails, the configuration controller board 30 finishes the path and setting change process without performing the setting change process.

After finishing the path and setting change process, the configuration controller board 30 judges whether or not both of the path change by the path change process and the path change by the setting change process have succeeded (step S107). When the path change and the path change have succeeded (step S107; YES), the configuration controller board 30 turns on the alternative I/O board 20' (step S108).

When the alternative I/O board 20' is successfully turned on (step S109; YES), the configuration controller board 30 proceeds with step S110. Then, the configuration controller board 30 sets, to each bridge device 22 in the alternative I/O board 20', the same logical bus numbers (the same upstream side bus number and downstream number) with those in corresponding bridge device 22 in the failed I/O board 20.

When the logical bus numbers successfully set (step S111; YES), the configuration controller board 30 performs a process (step S114) of incorporating the alternative I/O board 20' into the system. More specifically, the configuration controller board 30 performs a process of making the hot plug controller 13, which is for the bridge device 12 connected with the failed I/O board 20', incorporate the bridge device 12 into the system. Note that, at step S114, the configuration controller board 30 also performs a process of rewriting the physical/logical bus number translation information in the configuration information memory 34 to information representing the current situation. Furthermore, the configuration controller board 30 also performs a process of setting, into the FRU information memory 28 in the failed I/O board 20, the physical bus number and the logical bus number of each bus that is connected with each I/O bridge device 12 in the failed I/O board 20.

Then, the configuration controller board 30 performs a process (not illustrated) of displaying a message purporting that the boards are successfully replaced on the screen of the display device 38, and thereafter finishes this board replacement process (the process of FIG. 7).

On the other hand, when judging that the alternative I/O board 20' is not compatible with the failed I/O board 20 (step S102; NO), the configuration controller board 30 performs an replacement failure notification process (step S113). Herein, the replacement failure notification process is a process of displaying on the video screen of the video display unit 38 the message purporting that a replacement of boards fails, a message indicating the cause of the failure (failed process in the board replacement process), etc.

The configuration controller board 30 performs the replacement failure notification process (step S113), also when the separation of the I/O bus bridge device 12 from the system fails (step S104; NO). Furthermore, the configuration controller board 30 performs the replacement failure notification process (step S113) when both of the path change and the setting change fails (step S107; NO) and when the power up of the alternative I/O board 20' fails (step S109; NO).

Moreover, when setting of the logical bus number fails (step S111; NO), the configuration controller board 30 turns off the alternative I/O board 20' (step S112), and then performs the replacement failure notification process (step S113). That is, in this case, keeping the alternative I/O board 20' power on will only cause a useless consumption of electricity. The configuration controller board 30 therefore turns off the alternative I/O board 20' (step S112), and thereafter performs the replacement failure notification process (step S113).

Then, the configuration controller board 30 having finished the replacement failure notification process finishes this board replacement process.

Figure 8:
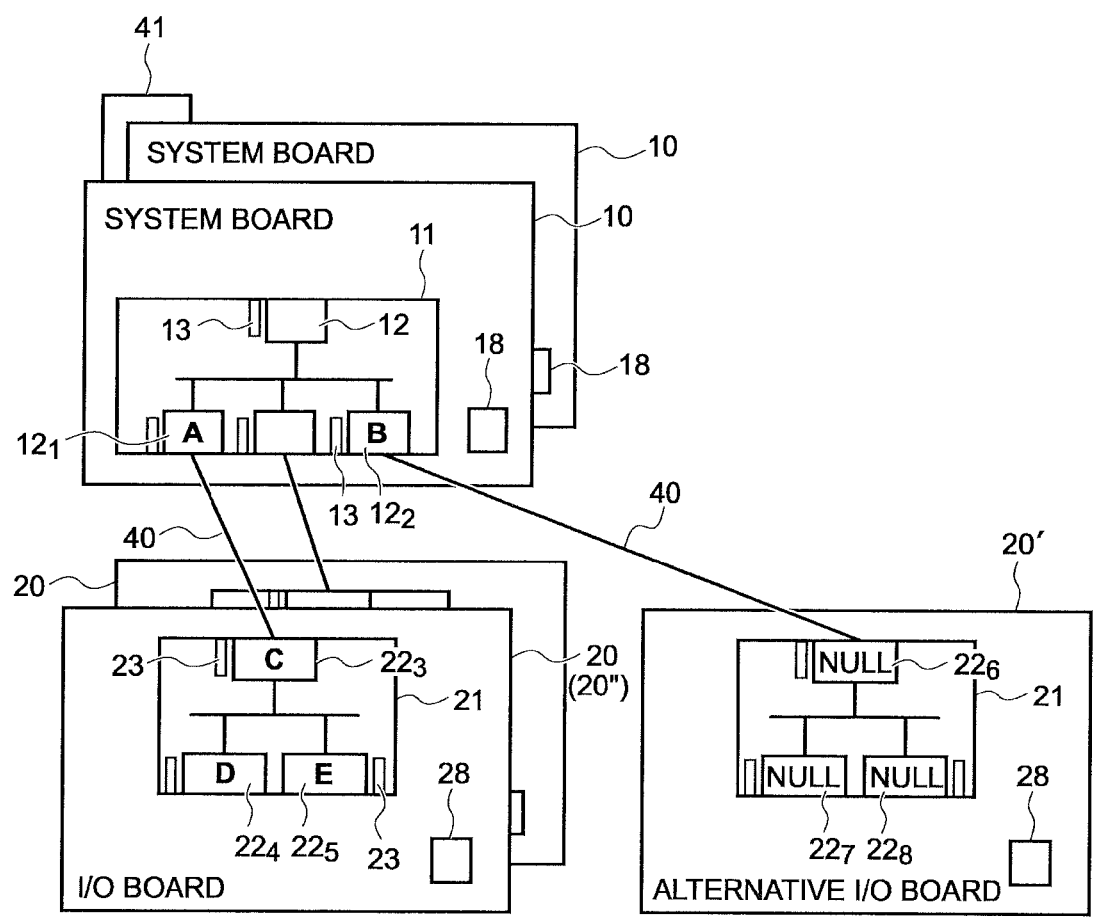
FIG. 8 is a diagram for explaining the contents of the board replacement process.

Hereinafter, contents of the board replacement process will be described more specifically referring to FIGS. 8 and 9.

An assumption is that the information system is in the situation depicted in FIG. 8, the I/O board 20 depicted on the lower side of FIG. 8 fails, and given is an instruction of replacing the same I/O board 20 (denoted in the following discussion as the failed I/O board 20") with the alternative I/O board 20'. Note that, in FIGS. 8 and 9, "A", "B", or the like placed in each bridge device 12$_X$ or 22$_X$ (X=1, 3, etc.) indicates the downstream side bus number set in each bridge devices 12$_X$ or 22$_X$.

In this case, after a confirmation that the alternative I/O board 20' can be used in place of the failed I/O board 20" (steps S101 and S102), the bridge device 12$_1$ in which "A" is set as the downstream bus number, and the failed bus I/O 20"

are separated from the system (step S103). Moreover, the process of turning off the failed I/O board 20" (step S105) is also performed.

Subsequently, by the path and fitting change process (step S106), "A" is set, as the downstream bus number, to the bridge device $12_2$ being connected with the alternative board I/O 20' and having the downstream bus number "B" (see FIG. 9). Next, the I/O board 20' is turned on (step S108). Further, to each bridge device 22X (X=6-8) in the alternative I/O board 20', set is the same upstream side bus number and downstream number with those in corresponding bridge device 22X (X=3-5) in the failed I/O board 20" (step S110).

Figure 9:
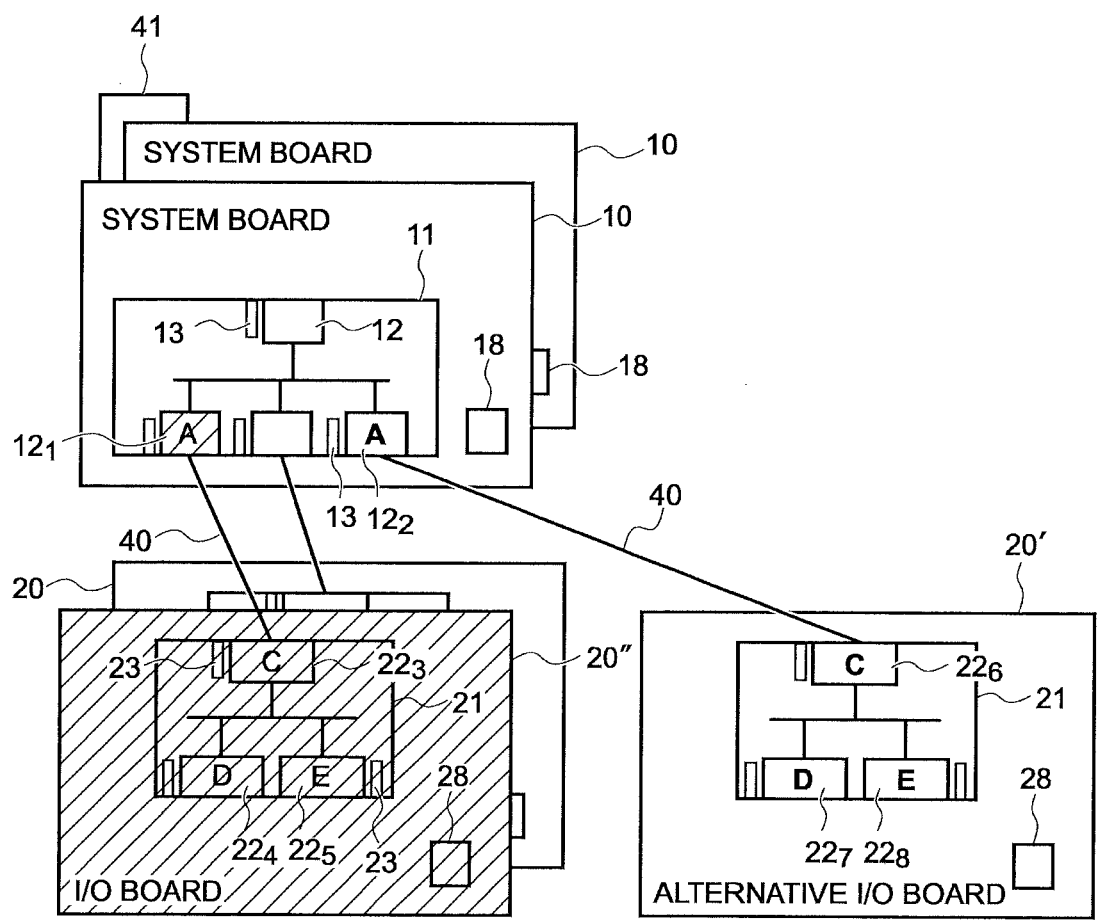
FIG. 9 is a diagram for explaining the contents of the board replacement process.

Therefore, as depicted in FIG. 9, when steps up to step S110 are completed, the information system enters a state where the same downstream side bus number as that set in the bridge device $12_1$ connected with the failed I/O board 20" is set in the bridge device 12 connected with the alternative I/O board 20'. Moreover, the information system also enters a state where, in each bridge device $22_X$ (X=6-8) in the alternative I/O board 20', the same upstream side bus number and downstream number as those set in corresponding bridge device $22_X$ (X=3-5) are set.

After completion of the steps to step S110, the alternative I/O board 20' is incorporated into the system (step S114). Note that, since the failed I/O board 20" etc. are, as represented by hatching in FIG. 9, already separated from the system (see step S103 etc.), the agreement between the settings of the alternative I/O board 20' and the settings of the failed I/O board 20' causes any trouble with the operation of the system. Therefore, upon successful completion of the board replacement process, the information system starts to operate in such a manner that the alternative I/O board 20 performs jobs that had been assigned to the failed I/O board 20".

Next, the board addition capability (capability of adding a new I/O board 20 to the system without shutting down the system) will be described.

Figure 10:
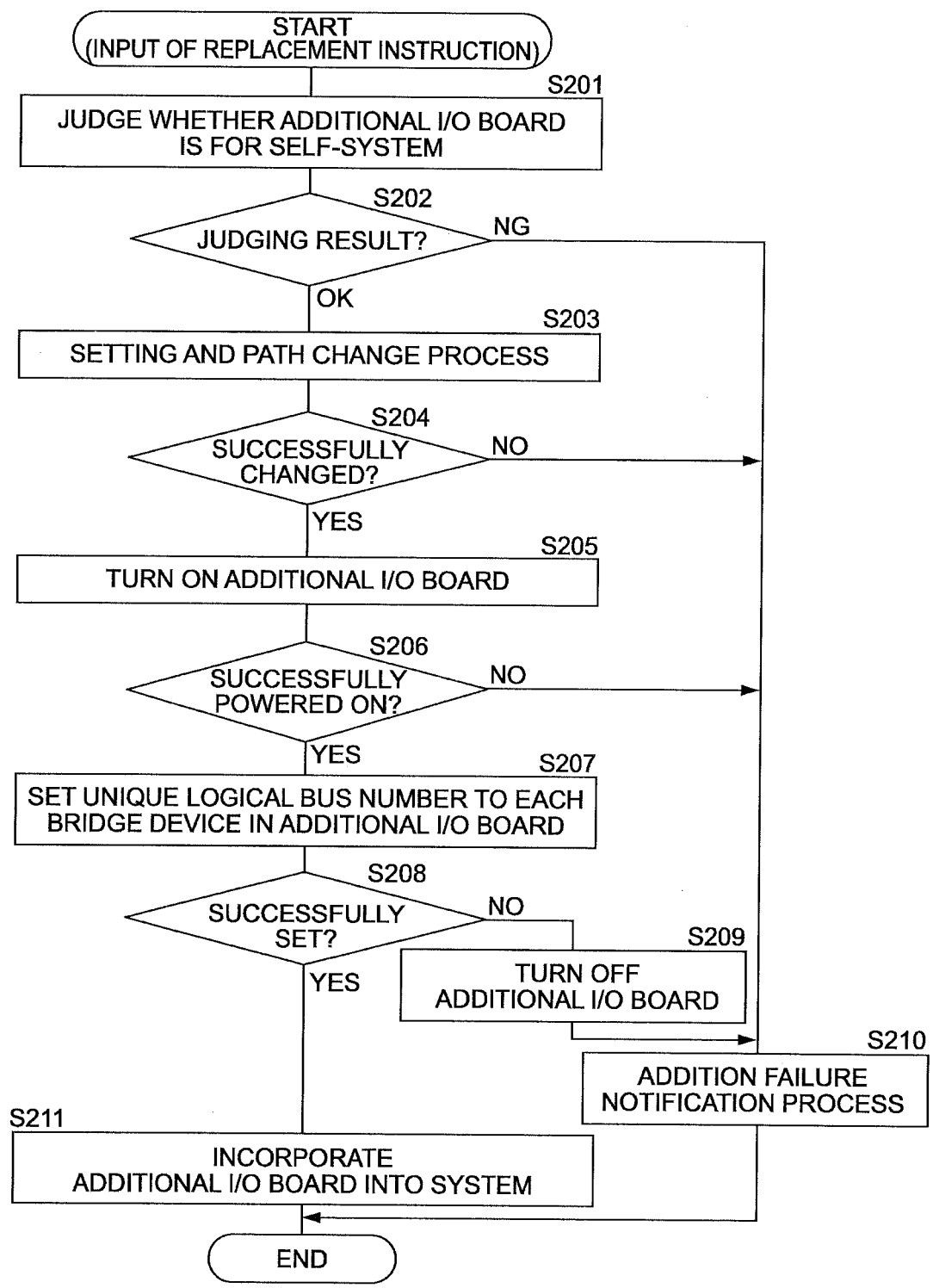
FIG. 10 is a flowchart of a board addition process.

When the operator, after inserting a new I/O board 20 into an empty slot of the backplane, issues an instruction to add the new I/O board 20 by operating the input unit 39, the configuration controller board 30 performs the board addition process in steps illustrated in FIG. 10.

That is, when the instruction to add the new I/O board 20 is issued, the configuration controller board 30 first judges, based on the FRU information in the I/O board 20 designated to be added (denoted in the following as the additional I/O board 20), whether or not the additional I/O board is for the self-system (the information system including itself) (step S201).

When judging that the additional I/O board 20 is for the self-system (step S202; O.K.), the configuration controller board 30 starts a setting and path change process (step S203). Then, the configuration controller board 30, to begin with, performs a setting change process of setting a unique downstream side bus number to the bridge device 12 connected with the additional I/O board 20. Here, the unique downstream side bus number is a downstream side bus number (a logical bus number for a downstream side bus) that has not yet been set in any of the bridge devices 12 and 22.

Next, the configuration controller board 30 performs a path change process of changing the state of the bridge device 12 connected with the additional I/O board 20 to the standby state. Note that the configuration controller board 30 performs this path change process only when the above-mentioned setting change process is successful (the upstream bus number can be actually set).

After finishing both of the path change process and the setting change process or only the path change process, the configuration controller board 30 finishes the setting and path change process, and then judges whether both of the path change by the setting change process and the path change by the path change process are successful (step S204). When both of the path change and the path change are successful (step S204; YES), the configuration controller boards 30 turns on the additional I/O board 20 (step S205).

When the additional I/O board 20 is successfully turned on (step S206; YES), the configuration controller board 30 sets a unique upstream side bus number and a unique downstream side bus number to each bridge device 22 in the additional I/O board 20 (step S207).

When setting of the logical bus numbers is successful (step S207; YES), the configuration controller board 30 performs a process (step S211) of incorporating the bridge device 12 connected with the additional I/O board 20 into the system. Moreover, at this step S211, the configuration information memory 34 also performs a process of rewriting the physical/logical bus number translation information in the configuration memory to information indicating the current situation. Furthermore, the configuration controller board 30 also performs a process of setting, to the FRU information memory 28 in the additional I/O board 20, the physical bus number and logical bus number of each bus connected with each bridge device 22 in the additional I/O board 20.

Then, the configuration controller board 30 performs a process (not illustrated in the figure) of displaying on the screen of the display device 38 a message purporting the board is successfully added, and thereafter finishes this board addition process.

Whereas when judging that the additional I/O board 20 is not for the self-system (step S202; NG), the configuration controller board 30 performs an addition failure notification process (step S210). The addition failure notification process is, similarly to the above-mentioned replacement failure notification process, a process of displaying on the video screen of the video display unit 38 a message purporting that addition of the board failed, a message indicating the cause of the failure.

The configuration controller board 30 also performs the addition failure notification process (step S210) when both of the path change and the setting change fail (step S204; NO) and when the alternative I/O board 20' is not successfully turned on (step S109; NO).

Moreover, when setting of the logical bus numbers fails (step S208; NO), the configuration controller board 30, after turning off the additional I/O board 20 (step S209), performs the additional failure notification process (step S210).

Then, the configuration controller board 30 having finished the additional failure notification process finishes the board addition process.

Figure 11:
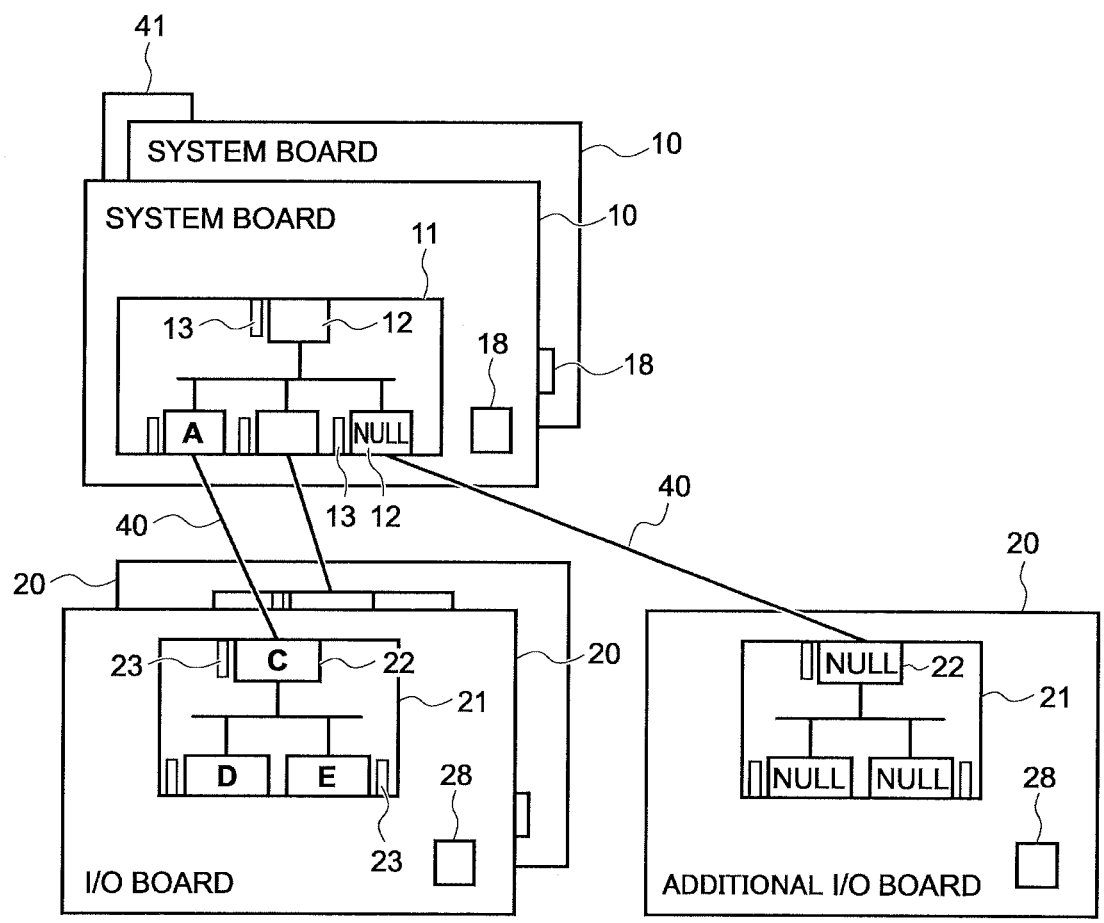
FIG. 11 is a diagram for explaining the contents of the board addition process.
Figure 12:
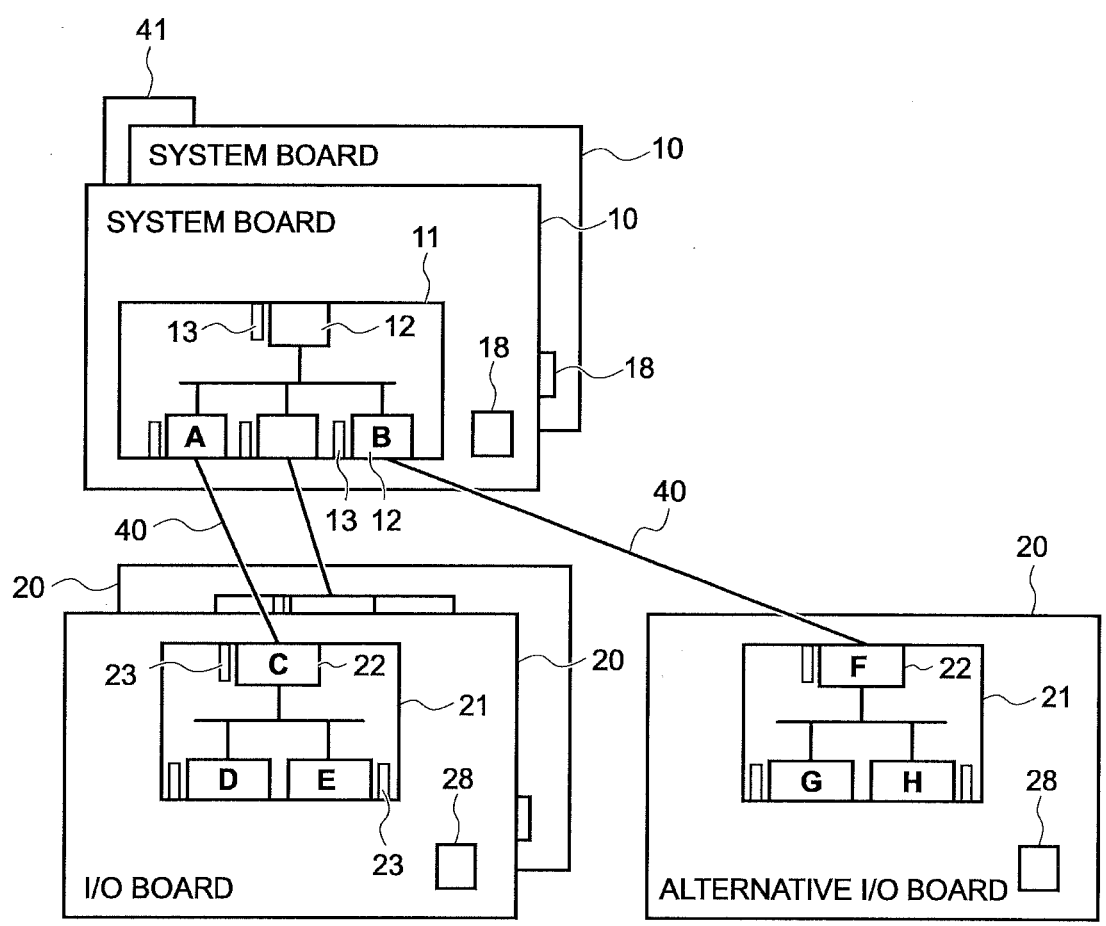
FIG. 12 is a diagram for explaining the content of the board addition process.
Figure 13:
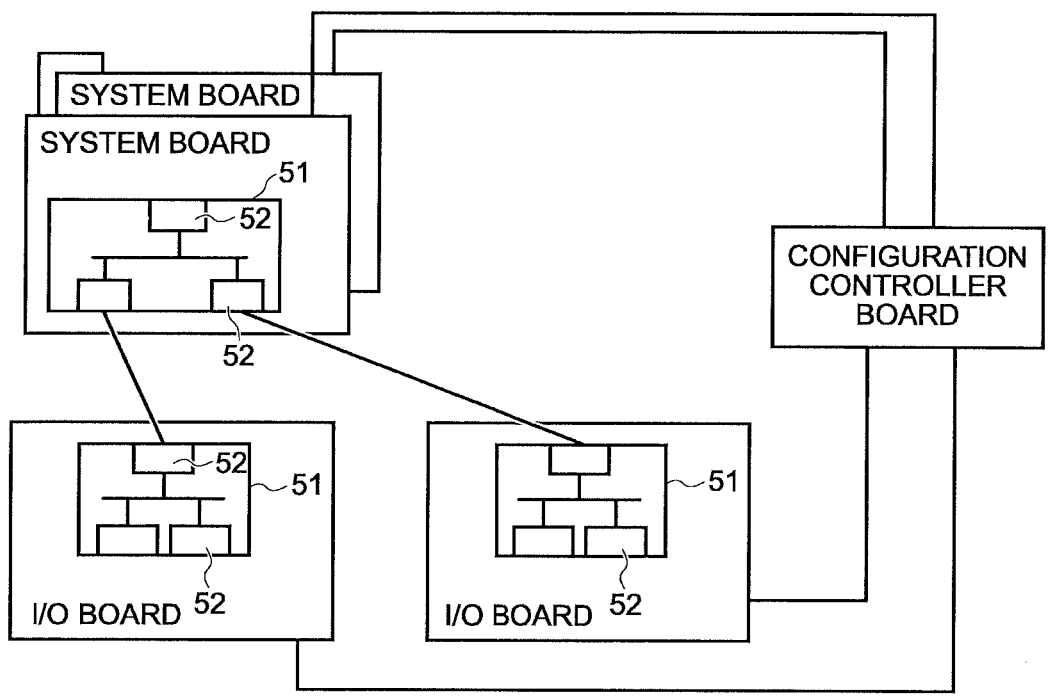
FIG. 13 is a schematic block diagram of an existing information system.

In short, this board addition process, if the status of the information system at the time when the additional I/O board 20 is added (inserted) is one depicted in FIG. 11, sets unique logical bus numbers to the bridge devices 22 in the additional I/O board 20, and the bridge device 12 in the system board 10 related to them. Note that, in FIGS. 11 and 12, "A", "B", etc. in each bridge device 12 or 22 is the downstream side bus number set in each bridge device 12 or 22.

Further, as already explained, in each board of the information system according to the present embodiment, prepared is firmware that can achieve a state where each CPU group 15 can control every part without troubles if only the upstream side bus number and the downstream side bus number are appropriately set to each of the bridge devices 12 and 22. Further, the configuration controller board 30 is, similarly to the existing configuration controller board, a board that sets the logical bus number to each of the bridge devices 12 and 22 when the system is started. Therefore, when the above-mentioned board addition process is completed normally, the information system will begin to operate in a status where each I/O device 25 in the additional I/O board 20 is also available.

As described above, the information system according to the embodiment has such a configuration that replacement of the I/O boards 20 and addition of the I/O board 20 can be performed without shutting down the system. Therefore, it can be said that the information system according to the embodiment is a more user-friendly system than the existing information system that needs to be reset for replacing the I/O boards 20 and adding the I/O board 20.

MODIFIED EXAMPLES

The above-mentioned information system can be modified in a variety of alternatives. For instance, the information system may be modified so that the configuration controller board 30 does not check compatibility between the boards in the board replacement process (FIG. 7). However, such modified information system serves as a system wherein a hang-up of a normal unit may occur when the operator makes a mistake in issuing a replacement instruction. Therefore, the configuration controller board 30 is desirable to be configured so as to check compatibility between the boards in some procedure, which does not need to be the same as the above-mentioned procedure, and then replaces the boards.

Moreover, in order to the need for the replacement instruction by the operator, the information system may be modified such a system that, when an I/O board 20 fails, replaces automatically the I/O board 20 with the alternative I/O board 20'.

However, a trouble (failure) occurs in the I/O board 20 with many functions is usually the one that results in some functions of the I/O board 20 being unavailable. Further, it is quite difficult to give, to the configuration controller board 30, a capability to confirm that all the available functions of the failed I/O board 20 is not used.

Therefore, from this point of view, it is better to use the configuration controller board 30 that replaces the boards when the operator inputs a replacement instruction.

Moreover, it is taken for granted that specific configuration of each component (board) of the information system may be differentiated from that described above, and that the FRU information is information whose contents are different from those of the information described above.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments) of the present invention have been described in detail, it should be understood that the various changes, substitutions, and alterations could be made hereto without departing from the spirit and scope of the invention.

AVAILABILITY ON INDUSTRY

The disclosed technology is available in the various fields in which processing by a computing device is needed.

What is claimed is:

1. An information system comprising:
a system board having a first bus bridge device and a second bus bridge device;
an active I/O board having multiple I/O bus bridge devices, which includes an I/O bus bridge device connected via a bus to the first bus bridge device of the system board;
a standby I/O board, for being used in place of the active I/O board when the active I/O board fails, having multiple I/O bus bridge devices, which includes an I/O bus bridge device connected via a bus to the second bus bridge device of the system board; and
a configuration controller board being connected to the system board, the active I/O board and the standby board via respective control buses, and having a capability to perform an I/O board replacement process that sets the downstream side logical bus number set in the first bus bridge device into the second bus bridge device after stopping operation of the first bus bridge device, and then sets each logical bus number set in each I/O bus bridge device of the active I/O board into corresponding I/O bus bridge device of the standby I/O.

2. The information system according to claim 1, wherein the configuration controller board monitors that the active I/O board fails, and performs I/O board replacement process when the active I/O board fails.

3. The information system according to claim 1, wherein the configuration controller board performs I/O board replacement process when replacement of the active I/O board for the standby I/O board is designated.

4. The information system according to claim 1, wherein each of the active I/O board and the standby I/O board includes a specification information memory stored with specification information indicating its specification, and
the configuration controller board reads out, from the specification information memory of the active I/O board and the specification information memory of the standby I/O board, two pieces of the specification information, judges whether or not the standby I/O board is one that can be used in place of the active I/O board, and performs the I/O board replacement process when the standby I/O board is one that can be used in place of the active I/O board.

5. The information system according to claim 1, wherein the configuration controller board powers on the active I/O board after stopping operation of the first bus bridge device, and powers off the standby I/O board before setting each logical bus number set in each I/O bus bridge device of the active I/O board into corresponding I/O bus bridge device of the standby I/O board.

6. An information system comprising:
a system board having multiple I/O bridge devices;
a configuration controller board connected to the system board and multiple I/O boards having multiple I/O bus bridge devices via respective control buses, and having a capability to perform an I/O board addition process that sets a unique upstream side logical bus number or a unique downstream side logical bus number into each of multiple I/O bus bridge devices of a newly connected I/O board to the system board, and then sets a unique downstream side logical bus number into an I/O bus bridge device of the system board connected via a bus to the newly connected I/O board.

* * * * *